United States Patent [19]

Kaji

[11] Patent Number: 5,122,899
[45] Date of Patent: Jun. 16, 1992

[54] RECORDING AND REPRODUCING APPARATUS

[75] Inventor: Toshio Kaji, Kanagawa, Japan

[73] Assignee: Canon Kabushiki Kaisha, Tokyo, Japan

[21] Appl. No.: 737,594

[22] Filed: Jul. 25, 1991

Related U.S. Application Data

[63] Continuation of Ser. No. 436,123, Nov. 13, 1989, abandoned. which is a continuation of Ser. No. 16,209, Feb. 19, 1987, abandoned.

[30] Foreign Application Priority Data

Feb. 24. 1986 [JP] Japan .................................. 61-38941
Mar. 10, 1986 [JP] Japan .................................. 61-50668

[51] Int. Cl.$^5$ ............................................. H04N 5/76
[52] U.S. Cl. .................................. 358/335; 358/906; 360/35.1; 360/62
[58] Field of Search ............ 360/10.1, 14.1, 33.1, 360/35.1, 60–62, 75, 78.01, 78.04, 106; 358/335, 342, 906, 907, 909

[56] References Cited

U.S. PATENT DOCUMENTS

| | | | |
|---|---|---|---|
| 3,890,639 | 6/1975 | O'Donnell | 360/62 |
| 3,911,484 | 10/1975 | Mutou | 360/33.1 |
| 4,517,611 | 5/1985 | Kimura | 360/14.1 |
| 4,573,087 | 2/1986 | Tezuka | 358/906 |
| 4,665,446 | 5/1987 | Takayama | 360/62 |
| 4,698,702 | 10/1987 | Miyake | 358/907 |

*Primary Examiner*—Roy N. Envall, Jr.
*Assistant Examiner*—W. R. Young
*Attorney, Agent, or Firm*—Robin, Blecker, Daley & Driscoll

[57] ABSTRACT

A recording and reproducing apparatus which is arranged to shorten a stand-by period and to suppress the appearance of noises comprises: a selection circuit arranged to select either a recording mode or a reproducing mode; and a control circuit which is arranged to operate, accxording to the result of detection of tracks on a recording medium, to shift a head to a vacant track on the medium when the recording mode is selected by the selection circuit. to shift the head to a recorded track on the medium when the reproducing mode is selected and to accomplish the shifting operation within a blanking period of a video signal.

8 Claims, 5 Drawing Sheets

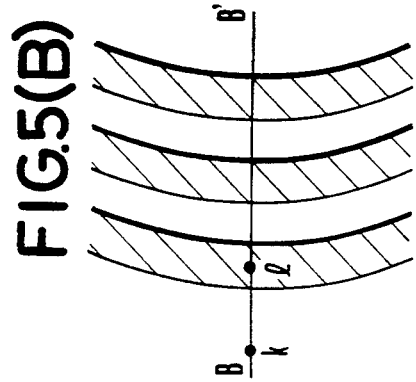
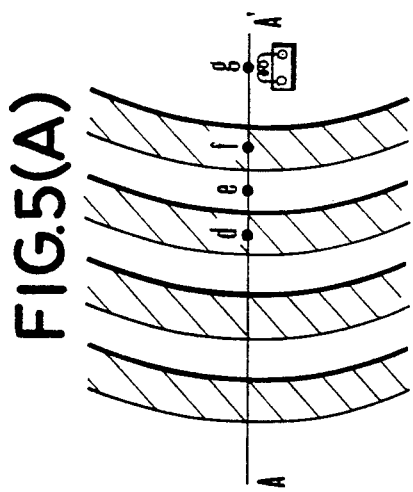
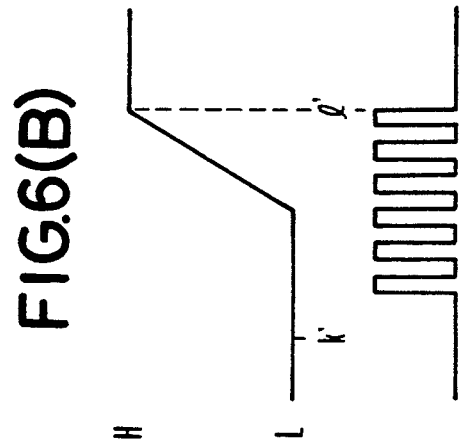
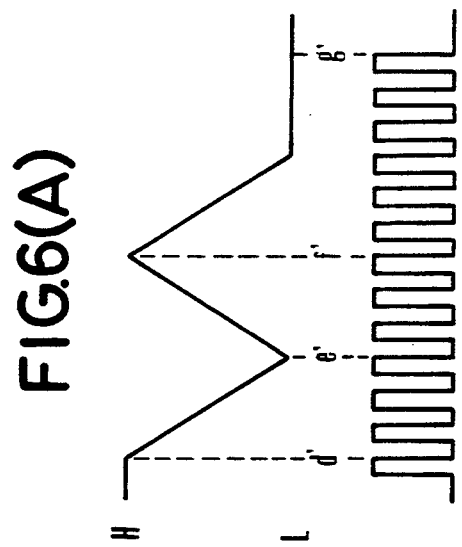

RECORDING AND REPRODUCING APPARATUS

This is a continuation application under 37 CFR 1.62 of prior application Ser. No. 436,123, filed Nov. 13, 1989, now abandoned which is a continuation of application Ser. No. 016,209, filed Feb. 19, 1987 now abandoned.

BACKGROUND OF THE INVENTION

1. Field of the Invention

This invention relates to a recording and reproducing apparatus, such as a still video camera (hereinafter referred to as an SV camera) or the like and more particularly to an apparatus which is capable of performing not only recording but also reproduction by means of a reproducing circuit which is arranged either within or not within the camera.

2. Description of the Related Art

The conventional SV camera uses, for example, a magnetic sheet or the like. Generally, for reduction in size, weight and cost, the SV camera has been arranged to have a recording function but no reproducing function. Hence, a discrete reproducer must be used for visual reproduction of a recorded image.

Of late, there has arisen a tendency to provide the SV camera either with an adapter or an internal reproducing function to permit visual reproduction for confirmation or observation of the image recorded by the camera.

The SV camera of the kind performing a reproducing operation with an adapter is, however, arranged in general to perform recording by sequentially shifting a magnetic head either from the outer periphery or from the inner periphery of the recording medium while detecting recorded tracks of the medium and by bringing it to a stop at an unrecorded track in a sequential manner. However, this sequence of the recording operation is not applicable as it is to a reproducing operation. Therefore, the reproducing operation has been complex and it has been difficult to readily obtain a recorded picture as desired.

The conventional magnetic recording and reproducing apparatus has been provided with a switching device which serves combined functions as recording means and as reproducing means and uses a magnetic head both for recording and for reproduction. In the conventional magnetic recording and reproducing apparatus, the magnetic head must be switched from a recording mode over to a reproducing mode and vice versa through such an arrangement as shown in FIG. 1 of the accompanying drawings. In FIG. 1, the illustration includes a recording amplifier 1; the magnetic head 2, a reproduction amplifier 3 and a switch SW. The switch SW of FIG. 1 which represents the above stated switching device has been composed of a relay in most cases. However, a switching element such as a transistor has recently come to replace the relay in many cases for the purpose of allowing reduction in size and weight, obtaining quick responsivity and saving electric energy, etc.

FIG. 2 shows a circuit arrangement of the conventional electronic switching circuit and FIG. 3 the wave forms of the outputs of various parts of FIG. 2. The arrangement of FIG. 2 includes capacitors Cl and C2; transistors Tr1 and Tr2; and resistors R1, R2 and R4 while parts which are the same as or equivalent to those of FIG. 1 are indicated by the same reference numerals.

The illustration in FIG. 2 includes input terminals a and b arranged to receive pulses for change-over between recording and reproduction. The polarity of the incoming pulses is as shown at parts a and b of FIG. 3. Parts c and d of FIG. 3 show the wave forms of the various parts which obtained upon receipt of these incoming pulses.

Referring to FIG. 2, when the switching circuit is shifted from a reproducing mode to a recording mode, the potential at a point c rises from zero volt up to a bias voltage VB produced from the recording amplifier. Meanwhile, the potential at another point d remains at zero.

When the recording mode is switched over to the reproducing mode, the potential at the point c is grounded and changes from the voltage VB to zero volt with the transistor Tr1 turned on. Meanwhile, the point e is opened with the transistor Tr2 turned off. As a result, the potential at the point d temporarily drops down to a minus value of the voltage vB and then rises according to a time constant defined by the capacitor Cl and the resistor R4. In such a way, a large negative voltage is applied to the point d, so that the above stated current flows via the head 2.

However, when the conventional apparatus is switched from the recording mode over to the reproduction mode, the transient current flowing through the magnetic head leaves some fixed flaw in a reproduced picture. This has been a problem with the conventional apparatus.

SUMMARY OF THE INVENTION

This invention is directed to the solution of the above stated problems of the prior art. A first object of the invention is to provide a recording and reproducing apparatus arranged to prevent a reproduced picture from being affected by any transient state of switching performed by a switching device.

A second object of this invention is to provide a recording and reproducing apparatus which is of the kind permitting selection between recording and reproducing modes and is arranged to be capable of performing optimum tracking control in each of these modes.

To attain this object, a recording and reproducing apparatus embodying this invention includes a switching device which is provided with means for causing switch-over between the recording and reproducing modes to be effected within the blanking period of a recorded video signal. The embodiment is, therefore, capable of eliminating any adverse effect on a reproduced picture by shifting the timing of switch over from the recording mode to the reproducing mode in such a way as to restrict the transient state of switching within the blanking period of the recorded video signal.

Another embodiment of this invention comprises selection means for selecting either a recording mode or a reproducing mode; and means for shifting a head, according to the result of detection of tracks on a recording medium, to an unrecorded (or vacant) track on the recording medium when the recording mode is selected by the selecting means and to a recorded track when the reproducing mode is selected by the selecting means. The embodiment minimizes access time required before a next performance of operation as the head is thus arranged to be brought to a vacant track upon selection of the recording mode and to a recorded track in the event of selection of the reproducing mode.

Further objects and features of this invention will become apparent from the following detailed description of a preferred embodiment thereof taken in connection with the accompanying drawings.

BRIEF DESCRIPTION OF THE DRAWINGS

FIGS. 5(A) and 5(B) show the sequential operations of a head to be performed in recording and reproducing modes and a pattern of tracks formed on a recording medium.

FIGS. 6(A,[.and 6(B) show envelope detection output wave forms obtained in recording and reproducing modes in upper parts of these drawings respectively and the wave forms of stepper motor driving pulses in lower parts of the drawings.

DETAILED DESCRIPTION OF THE PREFERRED EMBODIMENT

Figure 1:
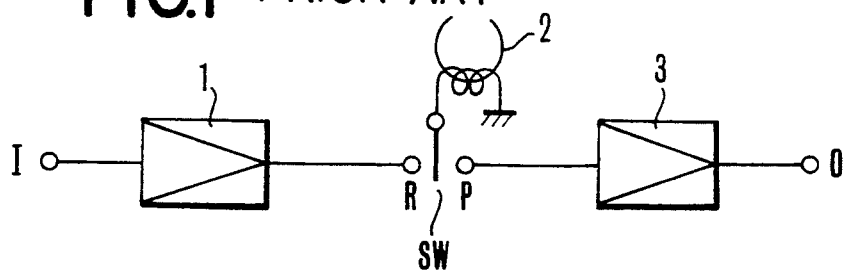
FIG. 1 is a schematic illustration of the conventional switching device.
Figure 2:
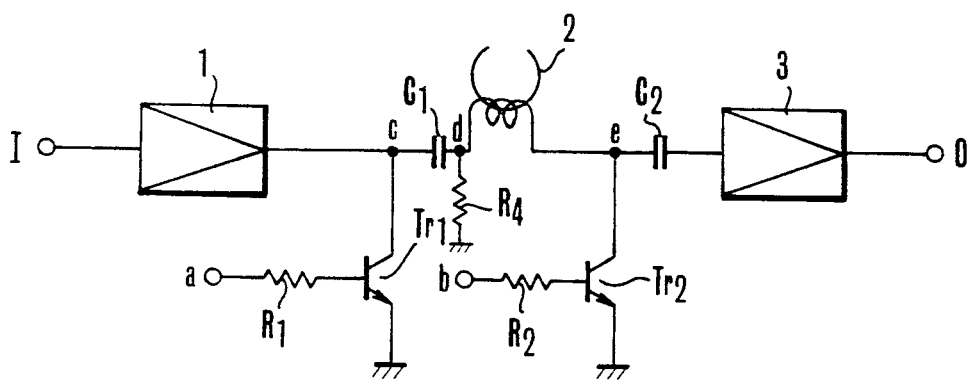
FIG. 2 is a circuit diagram showing the conventional switching device.
Figure 3:
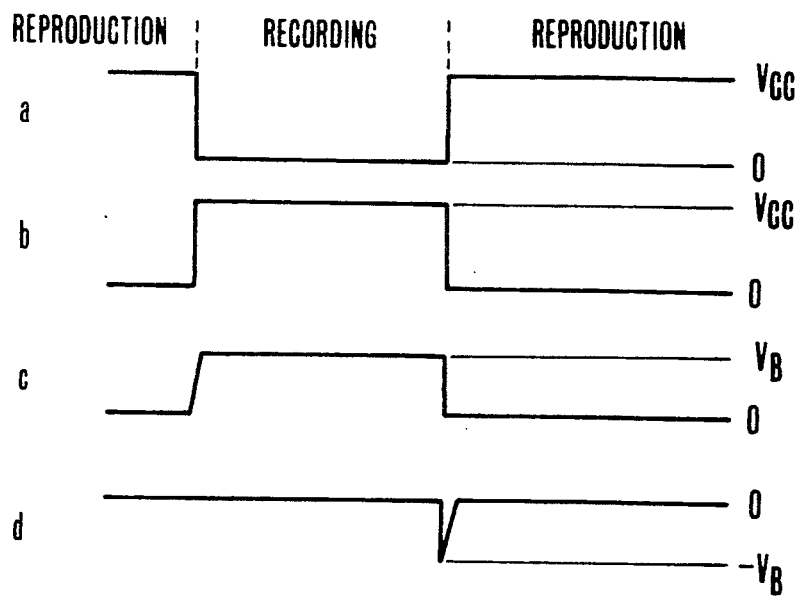
FIG. 3 consisting of a-d, is a timing chart showing the operation of the switching device of FIG. 2.
Figure 4:
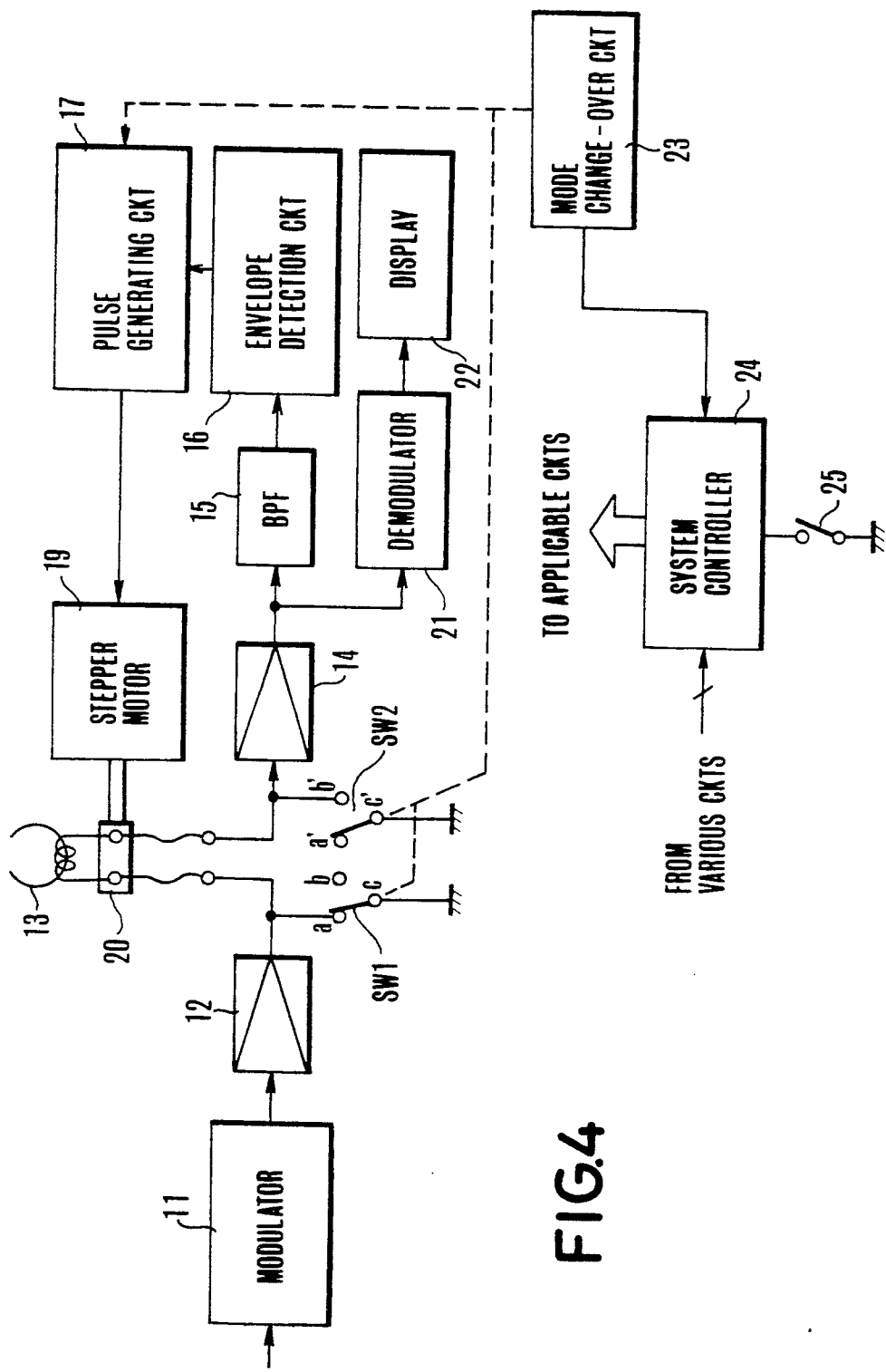
FIG. 4 is a block diagram showing essential parts of the recording and reproducing parts of an SV camera to which this invention is applied.

FIG. 4 shows an SV camera to which this invention is applied. In the embodiment, a modulator 11 is arranged to frequency modulate an image signal for recording. A recording amplifier 12 is arranged to amplify the image signal modulated by the modulator 11. A magnetic head 13 is arranged to record and reproduce information on and from a magnetic sheet which is not shown. A reproduction amplifier 14 is arranged to amplify an image signal reproduced by the head 13. A band-pass filter (BPF) 15 is arranged to extract a portion of the image signal around the carrier of the image signal after amplification by the reproduction amplifier 14. An envelope detection circuit 16 is arranged to detect the envelop of a signal produced from the BPF 15.

A pulse generating circuit 17 is arranged to generate pulses for driving a stepper motor on the basis of signals obtained from the envelope detection circuit 16 and the mode change-over circuit 23. The stepper motor 19 is arranged to be driven by the pulses generated by the pulse generating circuit 17. The head 13 is secured to a head carriage 20 which is arranged to be a moving part of the stepper motor 19. A demodulator 21 is arranged to demodulate the signal produced from the reproduction amplifier 14. A display device 22 is arranged to be used for monitoring the image demodulated by the demodulator 21. Switches SW1 and SW2 are arranged to have their connecting positions changed from one position over to another in response to the mode selection output of a mode change-over circuit 23 at the time of selection of the recording mode or the reproducing mode. A system controller 24 is arranged to control all the circuits of the SV camera. A reference numeral 25 denotes a release switch of the camera.

Figure 7:
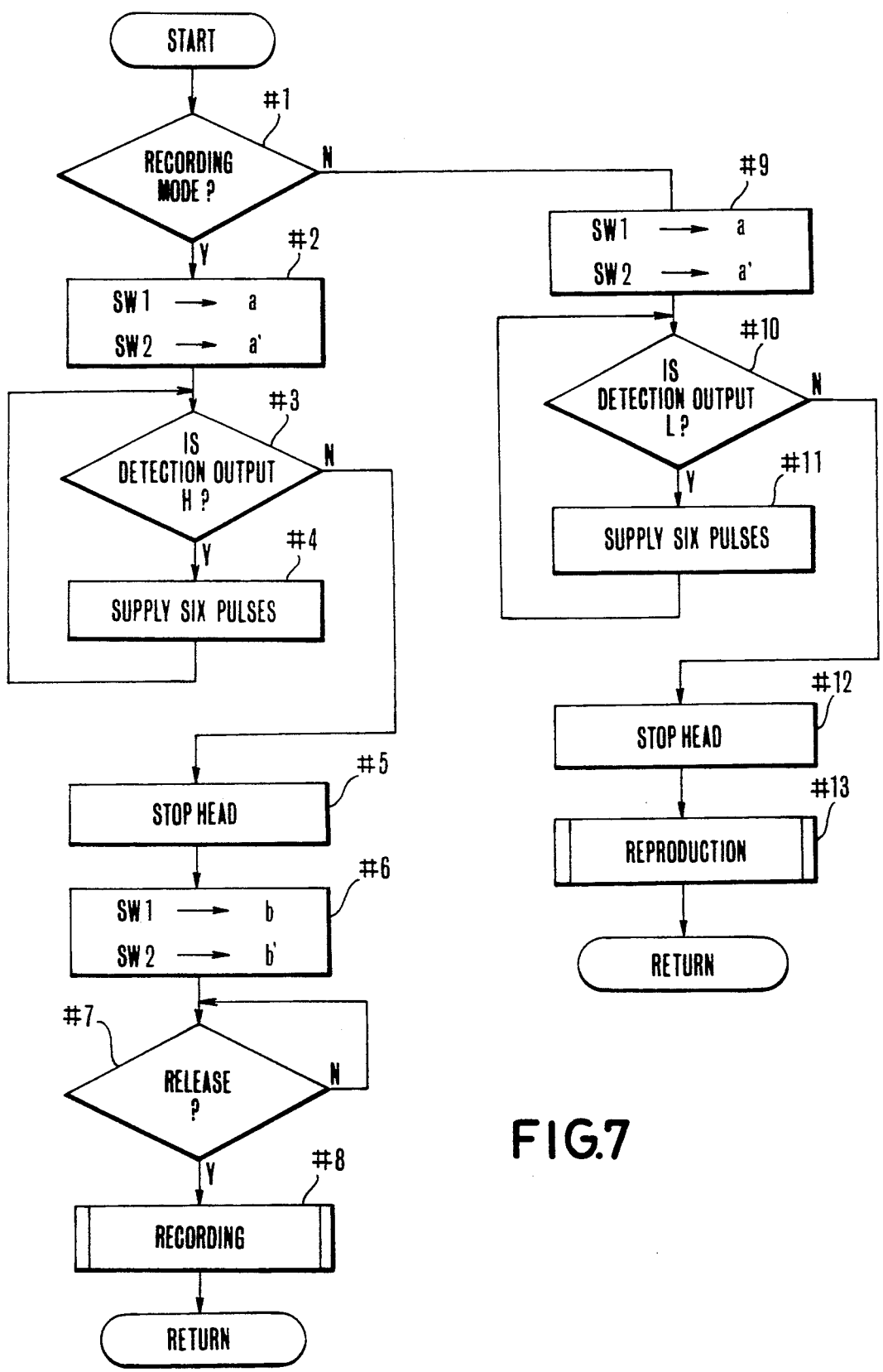
FIG. 7 is a flow chart showing the operation of the embodiment.

FIGS. 5(A) and 5(B) show the patterns of recording tracks formed on the magnetic sheet together with the state in which the head have access to the tracks during recording and reproduction. FIGS. 6(A) and 6(B) show the output wave forms of the envelope detection circuit 16 in relation to illustrations given in FIGS. 5(A) and 5(B) and the wave forms of the pulses used for driving the stepper motor 19. FIG. 7 is a flow chart showing the operation of the system controller 24.

The embodiment operates as follows. At a step #1: When the mode of the mode change-over circuit 23 changes to the recording mode in response to an operation on a switch which is provided on the camera if the camera is of the reproducing function incorporating type or on an adapter for reproduction if the camera is of the reproduction adapter using type. The camera may be arranged to have its mode changed from one mode over to the other concurrently with mounting or dismounting the adapter on or from the camera. At a step #2: The connecting position of the switches SW1 and SW2 which are responsive to the mode selection of the circuit 23 shift to their contacts a and a'. Then, a minute signal which is recorded on the magnetic sheet (not shown) and is picked up by the head 13 is amplified by a reproduction amplifier 14 and is then supplied to the BPF 15. The BPF 15 selects a frequency component around the modulated carrier of the amplified signal. The selected frequency component is supplied to the envelope detection circuit 16. (The circuit 16 may be arranged to perform a simple detecting operation, for example, by means of a diode.) The output wave form of the detection circuit 16 is as shown in the upper part of FIG. 6(A).

The alphabetical reference symbols used in FIGS. 5(A) and 5(B) respectively correspond to those used in FIGS. 6(A) and 6(B). Assuming that the position of the head is at a point d on a recorded track, the detection output is at a high (hereinafter referred to as H) level as indicated at a point d' in the upper part of FIG. 6(A). At a step #3: This is discriminated. Then, the H level signal is applied to the pulse generating circuit 17. At a step #4: Upon receipt of the H level signal, the pulse generating circuit 17 generates six pulses for shifting the position of the head 13 inward over the medium to an extent corresponding to one track. The head 13 is arranged to be shifted by one track width distance with six pulses produced to drive the stepper motor 19 through the head carriage 20. Then, the head 13 moves from the point d to a point e and further to a point f as shown in FIG. 5(A). Accordingly, the detection output level then changes from the level point d' to a point e' and further to a point f' as shown in FIG. 6(A). As shown, the level of the detection output again becomes H at the point f'. To shift the head 13 further inward by one track distance, the pulse generating circuit 17 is caused to again generate six pulses for shifting the head 13 from the point f to another point g.

Then, since the point g is in a vacant track in this instance, the detection output level becomes low (hereinafter referred to as L) as shown at a part between points f' and g' in FIG. 6(A). This is discriminated at the stop #3. Step #5: Then, no driving pulse is generated for the stepper motor 19 and the head 13 remains at the point g as shown in FIG. 5(A). Stop #6: The connecting positions of the switches SW1 and SW2 respectively shifts to their contacts b and b' and a recording mode setting operation comes to an end.

Step #7: After completion of the recording mode setting operation. a one shot image signal is supplied to the modulator 11 when a shutter release button 25 which is provided on the camera is turned on. The output of the modulator 11 is amplified by the recording amplifier 12. Step #8: Then, the output of the amplifier 12 is recorded by the head 13 in the vacant track on the magnetic sheet. After recording. the operation comes back to the start of the program.

The operation of the embodiment in the reproducing mode is as follows: Step #1: When the recording mode change to the reproducing mode, this change is discriminated. Step #9: The connecting positions of the switches SW1 and SW2 are shifted to their contacts a and a'. The signal picked up from the magnetic sheet by the head 13 is amplified by the reproduction amplifier 14 and is then supplied to the BPF 15 and the demodulator 21. The signal passed through the BPF 15 is subjected to an envelope detection process by the envelope detection circuit 16 in the same manner as in the case of the recording mode. The output of the circuit 16 is supplied to the pulse generating circuit 17.

When the head 13 is at a point k in a vacant track as shown in FIG. 5(B). the detection output is at an L level as indicated at a point k' in FIG. 6(B) because no recorded signal is picked up from the magnetic sheet under this condition. Step #10'. This condition is discriminated. Step #11: Then, contrarily to the operation in the recording mode, a low level signal is applied to the pulse generating circuit 17 to cause it to generate six driving pulses. The head 13 is then shifted from a point k to a point l to a recorded track as shown in FIG. 5(B).

Meanwhile, the level of the detection output changes from an L level of a point k' of FIG. 6(B) to an H level of a point l' of FIG. 6(B). This is discriminated at the step #10. Then, the pulse generating circuit 17 comes to stop generating pulses in response to this high level signal. Step #12'. Then, the head 13 is brought to a stop at the point l on the recorded track as shown in FIG. 5(B). Step #13: Under this condition. the reproduced signal picked up by the head 13 is supplied via the reproduction amplifier 14 to the demodulator 21. The signal is then demodulated into a video signal by the demodulator 21 and is displayed on the display device 22. The relation between the input and output of the pulse generating circuit 17 in the reproduction mode is arranged to be reverse to that of the recording mode. This converse relation can be obtained by inverting. in either of the modes, the signal from the detection circuit 16 by means of an inverter disposed either within or on the input side of the pulse generating circuit 17.

As described in the foregoing, the head is arranged to sequentially have access to the tracks. Therefore, the arrangement promptly readies the SV camera for recording or reproduction without necessitating any troublesome operation on the camera by the operator.

Figure 8:
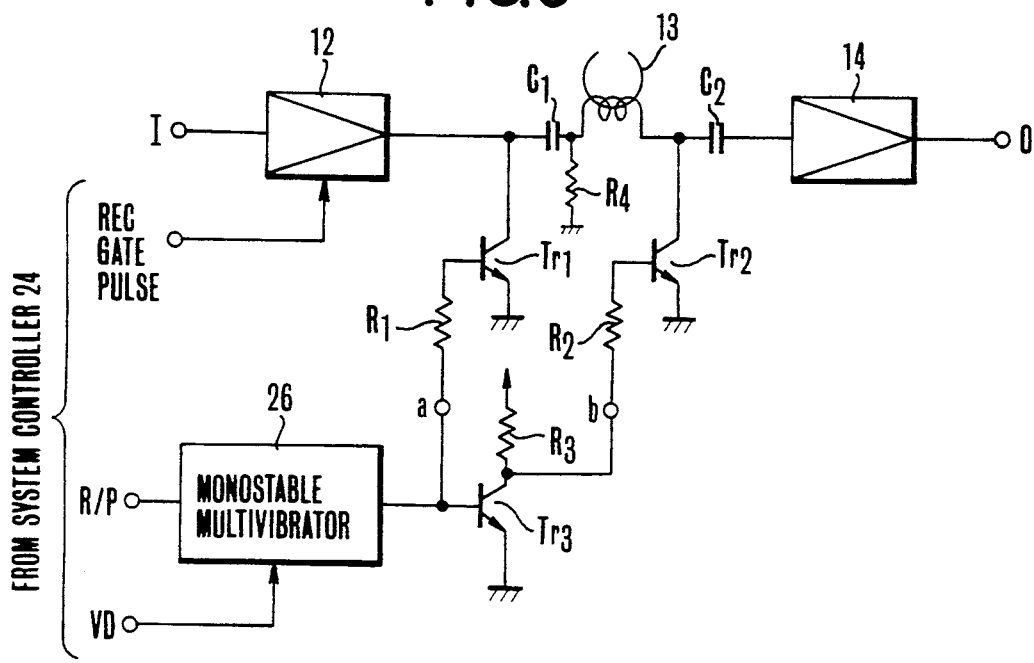
FIG. 8 is a circuit diagram showing a switching device embodying this invention.
Figure 9:
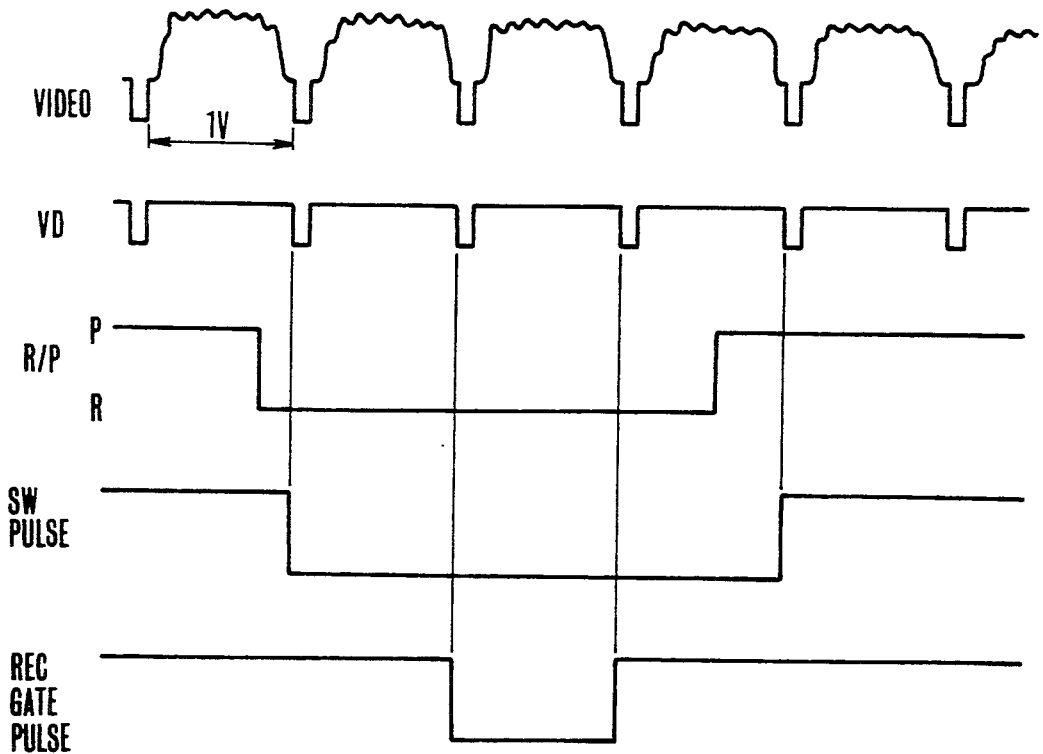
FIG. 9 is a timing chart showing the operation of the circuit shown in FIG. 8.

FIG. 8 is a circuit diagram showing the details of arrangement of the change-over switches SW1 and SW2 of the apparatus shown in FIG. 4. FIG. 9 is a timing chart showing the operation timing of the arrangement of FIG. 8. Referring to FIG. 8, an inverting transistor Tr3 is arranged to invert a switching pulse. A monostable multivibrator 26 is composed of a D flip-flop, etc.

The operation of the arrangement of FIG. 8 to be performed for a still video picture (SV) is as follows:

The mode change-over circuit 23 supplies its mode signal R/P (R representing the recording mode and P representing the reproducing mode) to the monostable multivibrator 26 at an H level in the case of selection of the reproducing mode and at an L level in the case of selection of the recording mode. When the level of the mode signal input of the monostable multivibrator 26 shifts from the H level to the L level representing the recording mode, the output level of the monostable multivibrator 26 changes from an H level to an L level indicative of the recording mode in synchronism with the fall of the vertical synchronizing signal of the system controller 24 which is synchronous with the vertical synchronizing signal VD of the video signal produced from the image sensing system which is not shown. One portion of the output of the monostable multivibrator 26 comes via a resistor R1 to the base of a transistor Tr1. The other portion of the output comes to the base of the transistor Tr3 and, after its polarity is inverted, reaches the base of a transistor Tr2 via a resistor R2. In the recording mode, the transistor Tr1 is thus off and the transistor Tr2 on. Under this condition, the level of a pulse signal REC GATE produced from the system controller 24 is at an L level just for one vertical scanning period to have an image recorded on the magnetic sheet by the magnetic head 13 during that period. After that, when the level of the input R/P of the monostable multivibrator 26 changes from the L level to an H level, the output level of the multivibrator 26 changes also changes from the L level to an H level representing the reproducing mode in synchronism with the fall of the vertical synchronizing signal VD which takes place immediately after the change of the input level from L level to the H level. Then, the transistor Tr2 turns off. However, since it is within the blanking period of the recording video signal, the reproduced or picture is never affected by any flow of the transient current caused by the capacitor Cl.

While the embodiment described is arranged to record and reproduce signals on and from a magnetic disc, this invention is of course likewise advantageously applicable also to recording and reproducing apparatuses of other kinds such as a VTR, etc.

What is claimed is:

1. A recording and reproducing apparatus, comprising:
    (a) a head for effecting recording or reproducing operation; and
    (b) mode setting means for setting a recording mode which enables a recording operation by said head or a reproducing mode which enables a reproducing operation by said head, in which after an image signal including an image period and a blanking period has been recorded on a recording medium, the mode is changed over from said recording mode to said reproducing mode during a period when said head is tracing an area where the blanking period of the image signal h as been recorded on said recording medium.

2. An apparatus according to claim 1, wherein said blanking period is the vertical blanking period of said video signal.

3. An apparatus according to claim 1, wherein said mode setting means includes a switching element which is arranged to shift said head into a recordable state and another switching element which is arranged to shift said head into a reproducible state.

4. An apparatus according to claim 1, wherein said mode setting means is arranged to displace said head following change-over of the state of head between said recordable and reproducible states.

5. A recording and reproducing apparatus, comprising:
   (A) a head for effecting recording and reproducing operation;
   (B) operation mode designating means or designating either a recording mode or a reproducing mode:
   (C) discriminating means for discriminating whether an area on a recording medium which is being traced by said head is in recorded state or in non-recorded state;
   (D) head shifting means for producing a shift of said head to a non-recorded area on the recording medium in the case where the recording mode is designated by said operation mode designating means and the recorded state is discriminated as a result of discrimination effected by said discriminating means, for producing a shift of said head to a recorded area on the recording medium in the case where the reproducing mode is designated by said operation mode designating means and the non-recorded state is discriminated as the result of discrimination effected by said discriminating means, and for producing no shift of said head in the case where the recording mode is designated by said operation mode designating means and the non-recorded state is discriminated as the result of discrimination effected by said discriminating means and in the case where the reproducing mode is designated by said operation mode designating means and the recorded state is discriminated as the result of discrimination effected by said said discriminating means.

6. An apparatus according to claim 5, wherein said discriminating means is arranged to discriminate whether the area on the recording medium which is being traced by said head is in the recorded state or in the non-recorded state, in accordance with a level of an envelope of a signal reproduced by said head from the recording medium.

7. An apparatus according to claim 5, wherein said head records an image signal including an image period and a blanking period on said recording medium or reproduces said image signal recorded on said recording medium.

8. An apparatus according to claim 7, further comprising:
   operation mode changing over means for changing over the operation of said head from the recording mode to the reproducing mode during the blanking period of the image signal recording on the area of t he recording medium which is being traced by said head, when the operation mode designated by said operation mode designating means is changed over from the recording mode to the reproducing mode.

* * * * *